United States Patent [19]
Tatani et al.

[11] Patent Number: 6,079,212
[45] Date of Patent: Jun. 27, 2000

[54] GASIFICATION POWER GENERATION PROCESS AND GASIFICATION POWER GENERATION EQUIPMENT

[75] Inventors: Atsushi Tatani; Makoto Susaki, both of Tokyo; Susumu Okino; Shintarou Honjo, both of Hiroshima, all of Japan

[73] Assignee: Mitsubishi Heavy Industries, Ltd., Tokyo, Japan

[21] Appl. No.: 09/210,619

[22] Filed: Dec. 14, 1998

[30] Foreign Application Priority Data

Jan. 29, 1998 [JP] Japan ................... 10-032029

[51] Int. Cl.$^7$ ........................................ F01B 31/16
[52] U.S. Cl. ................................. 60/694; 60/685
[58] Field of Search ................ 60/685, 694, 39.02, 60/39.182, 39.5; 415/200

[56] References Cited

U.S. PATENT DOCUMENTS

| | | | |
|---|---|---|---|
| 4,930,305 | 6/1990 | Bell | 60/39.5 X |
| 4,967,559 | 11/1990 | Johnston | 60/685 X |
| 5,180,285 | 1/1993 | Lau | 415/200 X |
| 5,224,338 | 7/1993 | Fujioka et al. | 60/39.02 |
| 5,439,348 | 8/1995 | Hughes et al. | 415/200 X |

OTHER PUBLICATIONS

Japanese Abstract: JP63123801A, May 27, 1988.
Japanese Abstract: JP01254226A, Oct. 11, 1989.
Japanese Abstract: JP06293888A, Oct. 21, 1994.

*Primary Examiner*—Hoang Nguyen

[57] ABSTRACT

This invention relates to a gasification power generation process wherein a product gas A1 obtained by the gasification of coal or petroleum is used as the fuel of a gas turbine 4 for electric power generation, the process comprising the steps of dedusting product gas A1, introducing product gas A1 directly into gas turbine 4 as the fuel thereof to effect electric power generation, and subjecting the exhaust gas A2 discharged from gas turbine 4 to a gas purification treatment including at least desulfurization. This invention can provide a gasification power generation process which is more suitable for practical use from an economic point of view in that a high degree of exhaust gas purification and a marked improvement in thermal efficiency can be achieved and, moreover, the construction of the equipment for carrying out a gas purification treatment including desulfurization can be highly simplified.

4 Claims, 1 Drawing Sheet

GASIFICATION POWER GENERATION PROCESS AND GASIFICATION POWER GENERATION EQUIPMENT

FIELD OF THE INVENTION AND RELATED ART STATEMENT

This invention relates to gasification power generation techniques such as coal gasification power generation. More particularly, it relates to a technique which enables the purification of gas to be carried out by very simple and economical equipment construction.

In recent years, the diversification of fuels is being advocated because of the exhaustion and rising cost of petroleum resources, and the development of techniques for utilizing coal and heavy oils is being promoted. As an example, attention is being paid to techniques for gasifying coal and heavy oils to utilize them for electric power generation. Moreover, since electric power generation using gases obtained by the gasification of coal and heavy oils is more efficient than conventional thermal electric power generation using coal and petroleum, such techniques are also attracting attention from the viewpoint of effective utilization of finite resources.

However, product gases obtained by the gasification of coal or heavy oils contain, for example, several hundred to several thousand parts per million (ppm) of sulfur compounds (chiefly hydrogen sulfide). It has conventionally been believed that such harmful components need to be removed at as upstream a position as possible in order to prevent environmental pollution or protect equipment against corrosion.

Among conventionally known processes for removing such sulfur compounds, the dry gas refining process described, for example, in Japanese Patent Provisional Publication Nos. 63-123801 and 1-254226 is advantageous from the viewpoint of thermal economy.

According to this process, an oxide of a metal (e.g., Fe) is used as an adsorbent, sulfur compounds contained in a gas are adsorbed by the adsorbent and removed in the form of a sulfide, the adsorbent having reduced adsorption capacity is regenerated by roasting it with an oxygen-containing gas, and the regeneration gas containing sulfur dioxide formed by the roasting reaction is introduced into a reactor where it is brought into gas-liquid contact with a calcium compound-containing slurry to effect the absorption of sulfur dioxide and the precipitation of gypsum formed as a by-product.

On the other hand, the wet gas refining process described, for example, in Japanese Patent Provisional Publication No. 6-293888 is known to be advantageous from the viewpoint of purification performance.

According to this process, sulfur compounds contained in a product gas are removed bringing the product gas into gas-liquid contact with a sulfur compound-absorbing fluid, and the absorbing fluid having absorbed sulfur compounds is heated to release a regeneration gas containing sulfur compounds. Then, this regeneration gas is burned to convert it into flue gas containing sulfur dioxide, and sulfur dioxide present in this flue gas is again absorbed by the wet lime-gypsum method to form gypsum.

Gasification power generation employing any of the above-described conventional gas refining techniques has the advantage that the exhaust gas discharged from power generation equipment can be highly purified and, moreover, useful gypsum can be yielded.

However, since gas refining equipment of complicated construction is required and this places a limit in reducing the space and cost requirements of the electric power plant, further improvements have been strongly desired for the purpose of carrying out gasification power generation more economically.

Moreover, the dry gas refining process has had the disadvantage that high purification performance (e.g., a high degree of desulfurization) cannot be achieved, while the wet gas refining process has had the disadvantage that the gas is cooled by contact with the absorbing fluid during gas refining to cause a reduction in thermal efficiency.

OBJECT AND SUMMARY OF THE INVENTION

An object of the present invention is to provide a gasification power generation process or gasification power generation equipment which is more suitable for practical use from an economic point of view in that a high degree of exhaust gas purification and a marked improvement in thermal efficiency can be achieved and, moreover, the construction of the equipment for carrying out a gas purification treatment including at least desulfurization can be highly simplified.

According to a first aspect of the present invention, the above object is accomplished by providing a gasification power generation process wherein a product gas obtained by the gasification of coal or petroleum is used as the fuel of a gas turbine for electric power generation, the process comprising the steps of dedusting the product gas, introducing the product gas directly into the gas turbine as the fuel thereof to effect electric power generation, and subjecting the exhaust gas discharged from the gas turbine to a gas purification treatment including at least desulfurization.

In this gasification power generation process, it is preferable that the gas purification treatment is an exhaust gas treatment based on the wet lime-gypsum method.

According to a second aspect of the present invention, there is provided gasification power generation equipment comprising a gasification furnace for gasifying coal or petroleum, dedusting means for dedusting the product gas obtained from the gasification furnace, a gas turbine for electric power generation into which the product gas leaving the dedusting means is directly introduced as the fuel thereof, and gas purification means for subjecting the exhaust gas discharged from the gas turbine to a gas purification treatment including at least desulfurization.

In this gasification power generation equipment, it is preferable that the material surfaces of the gas turbine which come into contact with the product gas and the exhaust gas are protected with a coating having corrosion resistance to at least impurities contained in the product gas.

Figure 1:
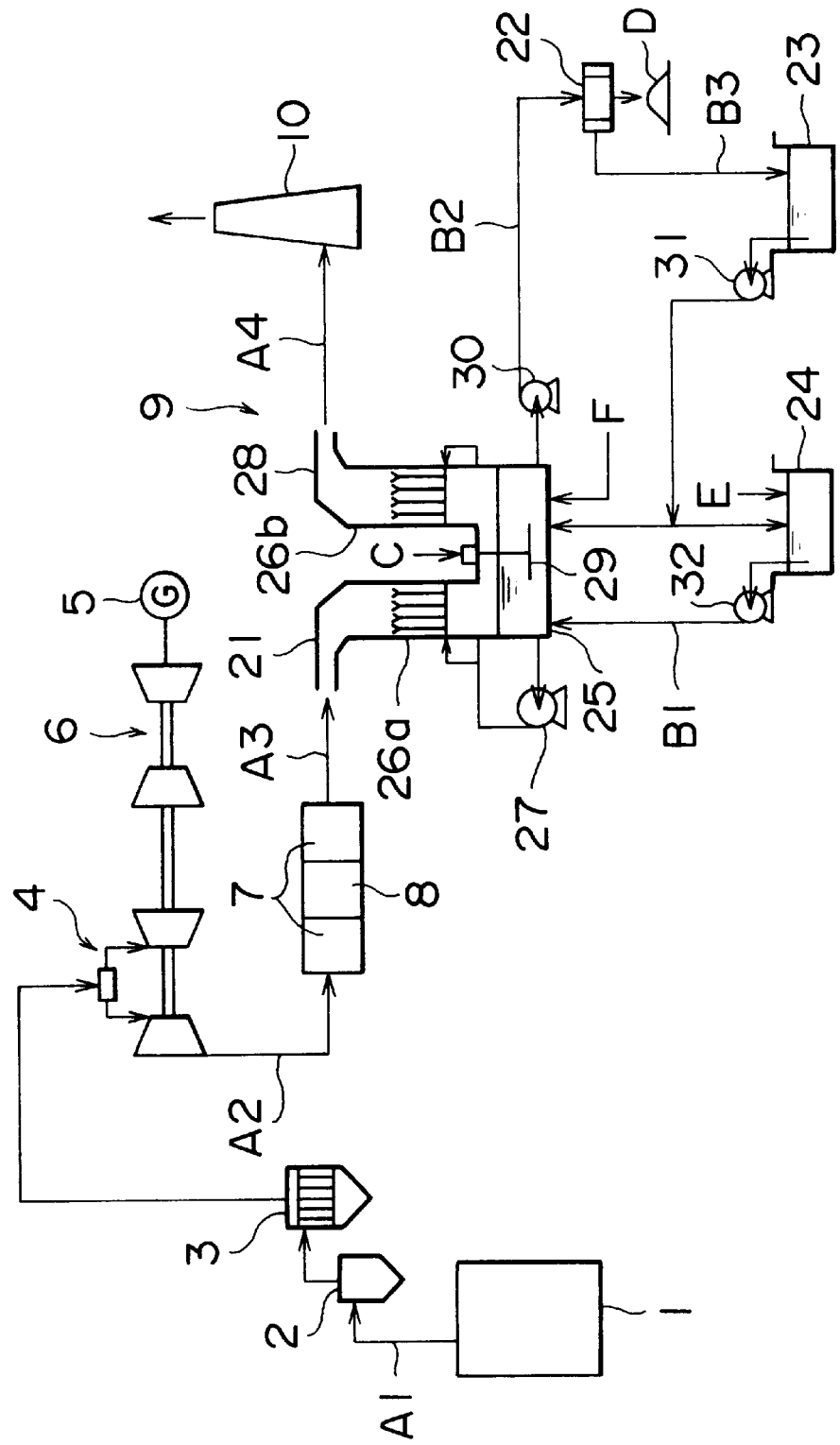
FIG. 1 is a flow diagram showing the construction of gasification power generation equipment in accordance with one embodiment of the present invention.

The reference characters given in this figure are defined as follows: 1, gasification furnace; 2, cyclone (dedusting means); 3, porous filter (dedusting means); 4, gas turbine; 8, denitrator (gas purification means); 9, exhaust gas treating apparatus (gas purification means); A1, product gas; A2 to A4, exhaust gas; B1, absorbing fluid; C, air; D, gypsum; E, absorbent (calcium compound).

DETAILED DESCRIPTION OF PREFERRED EMBODIMENTS

One embodiment of the present invention will be described hereinbelow with reference to the accompanying drawings.

FIG. 1 is a flow diagram illustrating gasification power generation equipment for practicing one embodiment of the present invention. Since the present invention is characterized by equipment construction for gas refining treatment and the like, the detailed construction of a power generation system itself (for example, the construction of a steam cycle) is not shown.

First of all, coal, for example, is gasified in a gasification furnace 1 by using air as the gasifying agent. Thus, product gas A1 consisting essentially of carbon monoxide and hydrogen is generated.

Such product gas A1 obtained by using coal as the raw material and air as the gasifying agent usually contains about 1,000 to 1,500 ppm of $H_2S$ (hydrogen sulfide) and about 100 ppm of COS (carbonyl sulfide), as well as about 1,000 to 1,500 ppm of $NH_3$ (ammonia) and about 100 ppm of HCl (hydrogen chloride).

Moreover, although product gas A1 just behind the outlet of the furnace typically has a temperature of 1,000 to 2,000° C., it is usually cooled, for example, to about 350° C. as a result of heat recovery by a steam heater (not shown) installed on the downstream side of the furnace. Its pressure is, for example, about 26 ata.

This product gas A1 is dedusted by dedusting means such as a cyclone 2 and a porous filter 3. Thereafter, as illustrated in FIG. 1, product gas A1 is directly introduced into a gas turbine 4 as the fuel thereof.

In gas turbine 4, product gas A1 is burned and its energy is utilized to drive a generator 5 and thereby effect electric power generation.

The electric power generation system in accordance with this embodiment is a so-called combined power generation system equipped with both gas turbine 4 and steam turbine 6. In the embodiment illustrated in FIG. 1, generator 5 is driven by the output of gas turbine 4 and the output of steam turbine 6. Moreover, the high-temperature and high-pressure steam generated and heated by the previously described steam heater and waste heat boilers 7 which will be described later is used to drive steam turbine 6.

The turbine blades and other components of gas turbine 4 are protected with a coating for improving their heat resistance and corrosion resistance, so that gas turbine 4 can be operated without any problem even if the above-described harmful components (e.g., hydrogen sulfide and hydrogen chloride) are contained in the fuel. Useful examples of the coating material include zirconia and other ceramic materials. Useful coating methods include ceramic coating by thermal spraying, chemical vapor deposition (CVD) and sputtering. Moreover, there may be employed a method which comprises applying a coating material to the surface to be protected and drying it to form, for example, a zirconia coating.

Next, exhaust gas A2 resulting from the combustion of product gas A1 in gas turbine 4 is introduced into waste heat boilers 7 and a denitrator 8 (gas purification means).

Denitrator 8, which is installed for the purpose of decomposing nitrogen oxides present in exhaust gas A2, functions to decompose nitrogen oxides with the aid of a catalyst according to the catalytic ammonia reduction process. Waste heat boilers 7 are boilers disposed before and behind denitrator 8 to recover heat from exhaust gas A2 and to generate or heat stream to be supplied to a steam turbine 6 for purposes of cogeneration. In order to optimize the gas temperature in denitrator 8, the heat recovery sections of waste heat boilers 7 are installed before and behind denitrator 8.

Next, exhaust gas A3 resulting from the denitration of exhaust gas A2 is introduced into an exhaust gas treating apparatus 9 (gas purification means) based on the wet lime-gypsum method, where exhaust gas A3 is chiefly subjected to a desulfurization treatment (i.e., the absorption of sulfur dioxide). Exhaust gas A4 resulting from the purification of exhaust gas A3 in exhaust gas treating apparatus 9 is conducted, for example, to a stack and discharged into the atmosphere. It goes without saying that, for example, a part of the purified exhaust gas A4 may be recycled to gasification furnace 1 for use as a part of the gasifying agent.

In this embodiment, exhaust gas treating apparatus 9 has the same construction as desulfurizers for use in conventional thermal electric power plants. By way of example, exhaust gas treating apparatus 9 is constructed as described below with reference to FIG. 1.

This apparatus 9 comprises an absorption tower 21 where exhaust gas A3 containing a high concentration of sulfur dioxide is brought into gas-liquid contact with an absorbing fluid B1 comprising a slurry containing a calcium compound as the absorbent and then discharged therefrom as purified exhaust gas A4, and where oxidizing air C is blown into the absorbing fluid having sulfur dioxide absorbed therein in the form of a large number of fine bubbles so as to oxidize sulfurous acid present in the absorbing fluid and thereby form gypsum; a solid-liquid separation means (e.g., centrifugal separator) 22 for effecting the solid-liquid separation of a slurry B2 (gypsum slurry) withdrawn from absorption tower 21; a filtrate pit 23 for storing the filtrate B3 yielded in solid-liquid separation means 22; and an absorbing fluid pit 24 for preparing absorbing fluid B1.

Moreover, this apparatus 9 may further be equipped with a gypsum heater (e.g., combustion furnace) for heating the solid matter D (gypsum dihydrate cake) separated in solid-liquid separation means 22 to a temperature of about 120 to 150° C. and thereby converting it into gypsum hemihydrate.

In this embodiment, absorption tower 21 has a tank 25 formed at the bottom thereof for holding absorbing fluid B1, and two tower bodies 26a and 26b juxtaposed above this single tank 25. The absorbing fluid within tank 25 is sucked up by means of a circulating pump 27, injected upward in the form of liquid columns from spray nozzles installed in each tower body, and thereby brought into efficient gas-liquid contact with exhaust gas A3.

Of the two tower bodies, tower body 26a is a so-called parallel-flow type gas-liquid contact tower, and tower body 26b is a so-called counterflow type gas-liquid contact tower. In this case, exhaust gas A3 to be treated is introduced into the top of tower body 26a, then introduced into the lower part of tower body 26b by way of the space above tank 25, and finally discharged from the top of tower body 26b.

It is to be understood that absorption tower 21 is not limited to the above-described construction, but may be otherwise constructed, for example, so as to have a plurality of additional tower bodies.

Moreover, a mist eliminator (not shown) is usually installed in an outlet duct 28 for the treated exhaust gas A4, so that any entrained mist is removed from exhaust gas A4 and returned to tank 25.

Tank 25 is equipped with a rotating-arm air sparger 29 for blowing air C in the form of fine bubbles and for agitating the whole slurry within tank 25. Thus, the absorbing fluid flowing down through both tower bodies while absorbing sulfur dioxide is brought into efficient contact with the air blown into tank 25, so that the absorbed sulfurous acid is almost totally oxidized and then undergoes a neutralization reaction with the calcium compound to form highly pure gypsum. Alternatively, a means for blowing in air C (e.g., a stationary air sparger or rotary atomizer) may be installed within tank 25 separately from an agitation means.

In a steady state, the absorbing fluid containing a high concentration of gypsum (i.e., slurry B2) is withdrawn from tank 25 by means of a pump 30, and transferred to a solid-liquid separator 22 where it is subjected to solid-liquid separation and its solid component is recovered as gypsum D. On the other hand, the filtrate resulting from the aforesaid solid-liquid separation (i.e., filtrate B3) is temporarily stored in filtrate pit 23, suitably sucked up by means of a pump 31, and conveyed to tank 25 or absorbing fluid pit 24. In any event, filtrate B3 is finally returned and reused in to tank 25.

In absorbing fluid pit 24, a calcium compound E (e.g., limestone) supplied from a silo (not shown) is mixed and stirred with a corresponding amount of filtrate B3, so that absorbing fluid B1 having a predetermined concentration is prepared. Absorbing fluid B1 within this absorbing fluid pit 24 is conveyed to tank 25 by means of a pump 32 while its flow rate is controlled in response, for example, to the detected value of the sulfur dioxide concentration in exhaust gas A3 which is the gas being treated.

Moreover, in order to make up for the water evaporated in absorption tower 21 and carried away by the exhaust gas in the form of water vapor, and the water discharged out of the system as water contained in or attached to gypsum D, make-up water F (e.g., industrial water) is supplied to tank 25, for example, in such a way that the fluid level within tank 25 will be kept within predetermined limits.

In common desulfurizers attached to typical thermal electric power plants and the like, a suitable measure is taken to prevent impurities (e.g., chlorine) absorbed into the absorbing fluid together with sulfur dioxide from accumulating in the liquid component of the circulating absorbing fluid. This may be accomplished, for example, by withdrawing a portion of the filtrate within the filtrate pit, subjecting it to a waste water treatment, and then discharging it out of the system or reusing it. The same construction may preferably be employed in this embodiment.

Now, the characteristic features of the gasification power generation process carried out in the above-described gasification power generation equipment are described below.

In this embodiment, product gas A1 leaving gasification furnace 1 is dedusted and then introduced directly into gas turbine 4 where it is used as the fuel of gas turbine 4. Consequently, most of the hydrogen sulfide and carbonyl sulfide contained in product gas A1 are converted into sulfur dioxide in this gas turbine 4, for example, according to the combustion reactions represented by the following equations (1) and (2). The resulting sulfur dioxide is discharged while being contained in exhaust gas A2 leaving gas turbine 4.

$$H_2S + 3/2O_2 \rightarrow SO_2 + H_2O \quad (1)$$

$$COS + 3/2O_2 \rightarrow SO_2 + CO_2 \quad (2)$$

Moreover, most of the ammonia contained in product gas A1 is converted into nitrogen oxides (e.g., $NO_2$), for example, according to the reaction represented by the following equation (3). The resulting nitrogen oxides are also discharged while being contained in exhaust gas A2. In addition, exhaust gas A2 further contains trace amounts of chlorine compounds formed from hydrogen chloride contained in product gas A1.

$$2NH_3 + 7/2O_2 \rightarrow 2NO_2 + 3H_2O \quad (3)$$

Among these harmful materials contained in exhaust gas A2, the nitrogen oxides are decomposed and removed in denitrator 8. The sulfur dioxide and the trace amounts of chlorine compounds are absorbed into the absorbing fluid in exhaust gas treating apparatus 9. Subsequently, the absorbed sulfur compound is utilized to form gypsum as a by-product, and the absorbed chlorine compounds are discharged out of the system while being contained, for example, in waste water from exhaust gas treating apparatus 9.

Thus, this embodiment is characterized in that the entire gas purification treatment, except dedusting, is carried out on the downstream side of the gas turbine and in that the gas purification treatment including desulfurization comprises an exhaust gas treatment based on the wet lime-gypsum method. Consequently, this embodiment has the following excellent effects from a practical point of view.

(1) Since the need of equipment elements such as an adsorption tower (or desulfurization tower) for removing hydrogen sulfide and a regeneration tower is completely eliminated and gas turbine 4 also functions as a combustion furnace for converting hydrogen sulfide and carbonyl sulfide into sulfur dioxide, the equipment construction is markedly simplified.

More specifically, gasification power generation equipment employing, for example, the conventional wet gas refining technique requires a large number of apparatus such as a desulfurization tower for absorbing hydrogen sulfide from the product gas on the upstream side of the gas turbine, a regeneration tower for releasing the absorbed gas, a heat exchanger for heating the gas leaving the desulfurization tower with the gas entering the desulfurization tower, a combustion furnace for burning the gas leaving the regeneration tower to convert hydrogen sulfide present therein into sulfur dioxide. Moreover, if it is also desired to remove carbonyl sulfide, a converter for converting carbonyl sulfide into hydrogen sulfide must be installed on the upstream side of the desulfurization tower. Furthermore, in order to remove chlorine compounds and ammonia from the product gas, it may be necessary to install a scrubbing tower for the product gas, for example, on the upstream side of the aforesaid desulfurization tower.

In this embodiment, however, the equipment construction is very simple in that the above-described equipment elements are totally unnecessary. Moreover, in order to carry out the gas refining treatment (or gas purification treatment) except; dedusting, a common exhaust gas treating apparatus 9 which has been employed in the prior art may only be installed on the downstream side of a denitrator 8 which has also been employed in the prior art as required. Furthermore, in spite of such simple equipment construction, sulfur compounds and nitrogen compounds and, moreover, chlorine compounds can be removed from the exhaust gas, so that highly purified exhaust gas A4 is obtained as a result of the treatment and, at the same time, useful gypsum D may be formed as a by-product.

(2) Since product gas A1 is not brought into contact with an absorbing fluid before being introduced into gas turbine 4, high thermal efficiency can be achieved. Thus, electric power can be efficiently generated by using valuable resources.

(3) Since the equipment for effecting gas refining may be composed entirely of apparatus (e.g., denitrator 8 and exhaust gas treating apparatus 9) which have produced satisfactory results in common existing thermal electric power plants involving no gasification, the reliability of the equipment is particularly enhanced.

It is to be understood that the present invention is not: limited to the above-described embodiment but may be practiced in various ways.

For example, the exhaust gas treatment for effecting desulfurization and the like is not limited to the above-described one based on the lime-gypsum method, but there may be employed other methods including, for example, the so-called magnesium hydroxide method using a magnesium compound as the absorbent for sulfur dioxide.

Moreover, the absorption tower of the exhaust gas treating apparatus is not limited to a liquid-column type absorption tower, but there may be used various types of absorption towers including spray towers, packed grid towers and gas dispersion type absorption towers.

Furthermore, the method of gasification may be such that, for example, oxygen is used as the gasifying agent. The treatment for denitrating exhaust gas from the gas turbine and the denitrator used for this purpose are not always necessary. When the concentration of nitrogen oxides in the exhaust gas is very low owing, for example, to the properties of coal and the like or the type of the gasification furnace or gas turbine, the aforesaid denitration treatment is not required as a matter of course.

According to the present invention, a gas produced in a gasification furnace is dedusted and then introduced directly into a gas turbine as the fuel thereof to effect electric power generation, and the exhaust gas discharged from the gas turbine is subjected to a gas purification treatment including at least desulfurization. That is, by changing the conventional conception in which a product gas is previously purified on the upstream side of a gas turbine, a product gas having undergone a dedusting treatment alone is burned in a gas turbine to effect electric power generation, and the exhaust gas discharged from the gas turbine is subjected to a gas purification treatment.

Consequently, the need of equipment elements such as an adsorption tower (or desulfurization tower) for removing hydrogen sulfide present in the product gas and a regeneration tower is completely eliminated, and the gas turbine also functions as a combustion furnace for converting hydrogen sulfide and carbonyl sulfide present in the product gas into sulfur dioxide. As a result, the equipment construction is markedly simplified.

Thus, as described above, the equipment construction in accordance with the present invention is very simple because, in order to carry out the gas refining treatment (or gas purification treatment) except dedusting, a treating apparatus similar in construction to, for example, common desulfurizers which have been employed in the prior art may only be installed on the downstream side of the gas turbine.

Moreover, in spite of such simple equipment construction, harmful components including at least sulfur compounds can be removed from the exhaust gas, so that highly purified exhaust gas is obtained as a result of the treatment and, when the wet lime-gypsum method is employed, useful gypsum is formed as a by-product.

Moreover, the present invention is advantageous in that, since the product gas is not brought into contact with an absorbing fluid before being introduced into a gas turbine, high thermal efficiency can be achieved. Thus, electric power can be efficiently generated by using valuable resources. Furthermore, since the equipment for effecting gas refining may be composed entirely of apparatus (e.g., a common desulfurizer and the like) which have produced satisfactory results in common existing thermal electric power plants involving no gasification, the reliability of the equipment is particularly enhanced.

In addition, when the material surfaces of the gas turbine which come into contact with the product gas and the exhaust gas are protected with a coating having corrosion resistance to at least impurities contained in the product gas, the gas turbine can be operated for a long period of time and the service life of the equipment can be easily lengthened to a practically sufficient extent, in spite of the equipment construction in which the product gas is not purified on the upstream side of the gas turbine.

What is claimed is:

1. A gasification power generation process wherein a product gas obtained by the gasification of coal or petroleum is used as the fuel of a gas turbine for electric power generation, said process comprising the steps of dedusting the product gas, introducing the product gas directly into the gas turbine as the fuel thereof to effect electric power generation, and subjecting the exhaust gas discharged from the gas turbine to a gas purification treatment including at least desulfurization.

2. A gasification power generation process as claimed in claim 1 wherein said gas purification treatment is an exhaust gas treatment based on the wet lime-gypsum method.

3. Gasification power generation equipment comprising a gasification furnace for gasifying coal or petroleum, dedusting means for dedusting the product gas obtained from said gasification furnace, a gas turbine for electric power generation into which the product gas leaving said dedusting means is directly introduced as the fuel thereof, and gas purification means for subjecting the exhaust gas discharged from said gas turbine to a gas purification treatment including at least desulfurization.

4. Gasification power generation equipment as claimed in claim 3 wherein the material surfaces of said gas turbine which come into contact with the product gas and the exhaust gas are protected with a coating having corrosion resistance to at least impurities contained in the product gas.

* * * * *